`US010682716B2`

United States Patent
Zhang et al.

(10) Patent No.: US 10,682,716 B2
(45) Date of Patent: Jun. 16, 2020

(54) METHOD FOR RAPIDLY FORMING A PART USING COMBINATION OF ARC DEPOSITION AND LASER SHOCK FORGING AND DEVICE IMPLEMENTING SAME

(71) Applicant: Guangdong University of Technology, Guangzhou, Guangdong (CN)

(72) Inventors: Yongkang Zhang, Guangdong (CN); Qingtian Yang, Guangdong (CN); Zhifan Yang, Guangdong (CN); Zheng Zhang, Guangdong (CN); Qiuyun Yu, Guangdong (CN)

(73) Assignee: Guangdong University of Technology, Guangzhou, Guangdong (CN)

( * ) Notice: Subject to any disclaimer, the term of this patent is extended or adjusted under 35 U.S.C. 154(b) by 0 days.

(21) Appl. No.: 16/512,350

(22) Filed: Jul. 15, 2019

(65) Prior Publication Data

US 2019/0337079 A1    Nov. 7, 2019

Related U.S. Application Data

(63) Continuation of application No. PCT/CN2017/094100, filed on Jul. 24, 2017.

(30) Foreign Application Priority Data

Jun. 27, 2017    (CN) .......................... 2017 1 0500880

(51) Int. Cl.
  B23K 9/04      (2006.01)
  B33Y 10/00    (2015.01)
  (Continued)

(52) U.S. Cl.
  CPC ............ *B23K 9/042* (2013.01); *B23K 9/0953* (2013.01); *B23K 9/0956* (2013.01);
  (Continued)

(58) Field of Classification Search
  CPC ...... B23K 9/042; B23K 26/348; B23K 26/34; B23K 26/342; B23K 26/356;
  (Continued)

(56) References Cited

U.S. PATENT DOCUMENTS 9,302,338 B2 *   4/2016   Zhang .................... B22F 3/1055
9,943,933 B2 *   4/2018   Xu ........................... F01D 5/005
(Continued)

FOREIGN PATENT DOCUMENTS

CN             1792513 A       6/2006
CN             1943959 A       4/2007
(Continued)

*Primary Examiner* — Tu B Hoang
*Assistant Examiner* — Bonita Khlok
(74) *Attorney, Agent, or Firm* — Wayne & Ken, LLC; Tony Hom

(57) ABSTRACT

A method for rapidly forming a part using combination of arc deposition and laser shock forging, including: 1) dividing a preforming part model into one or more simple forming units by the simulation system and determining a forming order of the forming unit; 2) controlling, by the numerical control device, an arc welding device to perform a melting deposition forming of a processing material layer by layer on a processing substrate of a motion platform to form a melting deposition layer; 3) controlling, by the computer, a movement of the motion platform to keep a fusion zone always in a horizontal state, at the same time, a pulse laser beam of a laser device to perform a synchronous shock forging on an arc deposition region at a plastic deformation temperature. A device for implementing the method.

3 Claims, 3 Drawing Sheets

(51) Int. Cl.
  *B33Y 30/00* (2015.01)
  *B33Y 40/00* (2020.01)
  *B33Y 50/00* (2015.01)
  *B33Y 70/00* (2020.01)
  *B23K 26/348* (2014.01)
  *B23K 26/356* (2014.01)
  *B23K 9/095* (2006.01)

(52) U.S. Cl.
  CPC .......... *B23K 26/348* (2015.10); *B23K 26/356* (2015.10); *B33Y 10/00* (2014.12); *B33Y 30/00* (2014.12); *B33Y 40/00* (2014.12); *B33Y 50/00* (2014.12); *B33Y 70/00* (2014.12)

(58) Field of Classification Search
  CPC ...... B23K 9/0953; B23K 9/0956; B23K 9/04; B33Y 10/00; B33Y 30/00; B33Y 40/00; B33Y 50/00; B33Y 70/00; B33Y 50/02; C21D 10/005

USPC .............................................. 219/76.1, 76.14
See application file for complete search history.

(56) References Cited

U.S. PATENT DOCUMENTS

| | | | |
|---|---|---|---|
| 2011/0057360 A1 | 3/2011 | Clark et al. | |
| 2015/0041025 A1* | 2/2015 | Wescott | B23K 9/042 148/538 |
| 2018/0354051 A1* | 12/2018 | Uecker | B23K 9/1093 |

FOREIGN PATENT DOCUMENTS

| CN | 101817121 B | 3/2012 |
|---|---|---|
| CN | 104619454 A | 5/2015 |
| CN | 106141435 A | 11/2016 |
| CN | 106735221 A | 5/2017 |
| CN | 106735967 A | 5/2017 |

\* cited by examiner

METHOD FOR RAPIDLY FORMING A PART USING COMBINATION OF ARC DEPOSITION AND LASER SHOCK FORGING AND DEVICE IMPLEMENTING SAME

CROSS-REFERENCE TO RELATED APPLICATIONS

This application is a continuation of International Application No. PCT/CN2017/094100, filed on Jul. 24, 2017, which claims priority from Chinese Patent Application No. 201710500880.2, filed on Jun. 27, 2017, both of which are hereby incorporated by reference in their entireties.

TECHNICAL FIELD

The present invention relates to a method and a device for manufacturing a part and a mold by forging, in particular to a method for rapidly forming a part using combination of arc deposition and laser shock forging and a device implementing same.

BACKGROUND OF THE INVENTION

With the rapid development of modern industrial technology, there is an increasing requirement of the manufacture of structures and certain key components and their service performance, such as low cost, short process and non-polluting manufacture, as well as excellent comprehensive physical and mechanical properties, etc. Direct rapid forming manufacturing technology is widely regarded in the industry as the most difficult cutting-edge technology in advanced manufacturing technology field. In the 1970s, high-energy beam forming technology represented by laser, electron beam and plasma beam was continuously developed and made great progress in the rapid manufacturing of parts. High-energy beam direct forming technology integrates mechanical engineering, CAD, numerical control technology, high-energy beam and material science and technology, and the design idea can be quickly transformed into a final part or mold with a certain structure and function. Due to the characteristics of rapid heating and solidification and free growth forming and effects of process parameters and external environment, the existing rapid manufacturing method may generate the internal defects such as pores, incomplete fusion, cracks and shrinkage porosity. With the increasing number of scanning layers during the melting deposition forming, the additive effect of residual stress inside the parts become obvious, such that the parts are easy to crack and deform, and the stability of the structure performance is poor, which will severely affects the processing yield of the parts, and greatly restricts popularization and development of high energy beam direct forming technology. CN101817121 disclosed a "combined manufacturing method for forming a part and mold and auxiliary device thereof", which adopts miniature rollers or a miniature extruding device to compress and process a melting deposition region, thereby preventing the fused material from shedding, flowing, collapsing, avoiding cracking of the forming parts, reducing or eliminating the residual stress, improving structural performance, ensuring the forming stability of parts, effectively reducing the staircase effect on the surface of the formed body, and improving the forming precision and the surface quality. However, since the device adopted the rollers or extruding device, it is difficult to process certain complex structures, such as a fine bore structure and a sharp corner transition surface.

SUMMARY OF THE INVENTION

In order to solve the problem that the internal defects generated during the forming process of the parts in the existing rapid manufacturing such as pores, incomplete fusion, cracks and shrinkage porosity result obvious additive effect of the residual stress inside the parts in the melting deposition forming with the increasing number of scanning layers, which cause the parts to crack and deform easily. The present invention provides a method for rapidly forming a part using combination of arc deposition and laser shock forging and a device implementing same with great structural stability, high yield and safety.

The present invention includes the following technical solutions:

A method for rapidly forming a part using combination of arc deposition and laser shock forging, including:

1) importing a drawn 3D model of the part into a simulation system of a computer; dividing a preforming part model into one or more simple forming units by the simulation system and determining a forming order of the forming units; laminating and slicing the forming units in a stack direction; processing data according to the laminated slices to generate a numerical control code for processing slices respectively;

2) sending the numerical control code of each slice from the computer to a numerical control device; controlling, by the numerical control device, an arc welding device to perform a melting deposition forming on a processing material layer by layer on a processing substrate of a motion platform to form a melting deposition layer;

3) controlling, by a computer, a movement of the motion platform to keep a fusion zone always in a horizontal state, at the same time, a pulse laser beam of laser device to perform a synchronous shock forging on an arc deposition region at a plastic deformation temperature; during a processing, a synchronous simulation processing is performed by the simulation system of the computer, while the melting deposition layer is scanned in real time through a scanning imaging system, and data of temperature, thickness and shape of the melting deposition layer are transmitted to the computer; the imaging data and simulation data are comparatively analyzed, a working state of an arc welding gun and the laser device are adjusted and controlled by the computer according to a feedback.

Step 3) specifically comprises the following steps: collecting and transmitting the data of the temperature of the arc deposition region by an infrared thermal imaging system to the computer; performing the shock forging on the melting deposition layer by the pulse laser of the laser device when the temperature of the arc deposition region is cooled to a recrystallization temperature; when the temperature of the arc deposition region is too high/low, outputting a control signal to the arc welding device by the computer to reduce/ improve an input power of the arc welding device to achieve a closed-loop control.

The computer determines a pulse width of the pulse laser according to a thickness of the melting deposition layer, and determines a laser forging frequency and a spot value according to a width of the melting deposition layer. The laser device is controlled by the computer to perform the synchronous shock forging on the arc deposition region of the melting deposition layer within the plastic deformation temperature. A laser data is collected by the computer through a beam quality detecting device, then a control signal is output by the computer to adjust the pulse width, forging frequency and spot value of the laser.

The arc welding device is an argon or $CO_2$ arc welding gun.

The processing material is a weldable metal, an alloy material, a ceramic composite material, or a gradient changeable composite material.

A device for implementing the method mentioned above, comprising a controller, the motion platform, the numerical control device, the arc welding device, the laser device, the scanning imaging system and a mechanical arm. The controller is electrically connected to the numerical control device and the laser device, and the numerical control device is electrically connected to the arc welding device and the mechanical arm. The arc welding device containing the processing material is fixedly mounted on the mechanical arm. The arc welding device is controlled by the numerical control device through the mechanical arm to perform a melting deposition forming of the fused processing material layer-by-layer on the motion platform. The beam of the laser device acts on the processing material on the motion platform, and the controller scans the temperature, thickness and morphology of the processing material on the motion platform through the scanning imaging system.

The arc welding device comprises a material and gas storage chamber, a power source and an arc welding gun, and the controller is electrically connected to the arc welding gun through a power source. A feeding inlet of the arc welding gun is connected to an outlet of the material and gas storage chamber, and the outlet of the arc welding gun is arranged above the motion platform. The arc welding gun is fixedly mounted on the mechanical arm.

The laser device comprises a laser generator and an optical system, and the beam emitted by the laser generator acts on the processing material on the motion platform through the optical system electrically connected to the controller.

The scanning imaging system is an infrared scanning imaging system.

The controller is a computer.

1. Benefits of the present invention are as follow:

In operation, the arc welding device performs an arc deposition on the workbench to form a melting deposition layer, the temperature of the arc deposition region is in the range of plastic deformation temperature. The controller controls the laser device to perform synchronous shock forging on the arc deposition region of the melting deposition layer, which not only ensures the rapid forming of the parts, improves the manufacturing efficiency, but also ensures the forming quality of the parts, refines the grains of the melting deposition layer, eliminates the internal defects such as the pores of the melting deposition layer as well as the thermal stress and the residual stress, and effectively controls the macroscopic deformation and cracking problems significantly improves the internal quality and comprehensive mechanical properties of the part. The problem of flowing, shedding and collapsing of fused processing materials is solved as the result of using computer to control the multi-degree-of-freedom spatial motion platform.

2. The computer of the present invention obtains the parameters of the melting deposition layer within the forging temperature interval according to the obtained temperature, thickness and morphology data of the melting deposition layer, controls the pulse laser to work, and adjusts the output energy, pulse width, frequency to adapt to different thickness and different area of the melting deposition layer. The laser shock forging is performed on the melting deposition layer in the forging temperature interval to eliminate internal defects such as pores, cracks, shrinkage porosity, and thermal stress and residual stress in the melting deposition layer.

3. When the imaging data deviates from the simulation data, the computer will adjust the parameters of the arc welding gun and the pulse laser. The parameters include arc welding voltage and current, welding speed and the feed quantity of material and gas as well as laser power, pulse width, forging frequency and spot shape and size. The arc welding parameters interact with the laser parameters to ensure that the working efficiency of the arc welding gun and the pulse laser is well-matched and the manufacturing quality of the parts is thereby guaranteed. When the angle of the melting deposition layer deviates, the laser beam of the pulse laser is controlled by the computer to impact forge the two sides or one side of the melting deposition layer at a certain oblique angle to precisely correct the shape of the melting deposition layer, eliminating the internal defects such as pores, cracks, shrinkage porosity, etc. in the melting deposition layer, as well as the thermal stress and the residual stress.

BRIEF DESCRIPTION OF THE DRAWINGS

In order to further illustrate the embodiments of the present invention or the technical solutions in the prior art, the drawings used in the embodiments or the prior art will be briefly described below. Obviously, the drawings in the following description are only some of the embodiments of the present invention, and the ordinary skills in the art can obtain other drawings according to the following drawings without any creative work.

DETAILED DESCRIPTION OF EMBODIMENTS

The technical solutions in the embodiments of the present invention are clearly and completely described in the following with reference to the accompanying drawings. Obviously, the described embodiments are only a part of the embodiments of the present invention rather than all of which, and other embodiments obtained by the ordinary skill in the art based on the embodiments of the present invention without creative efforts are within the scope of the present invention.

Embodiments

Figure 1:
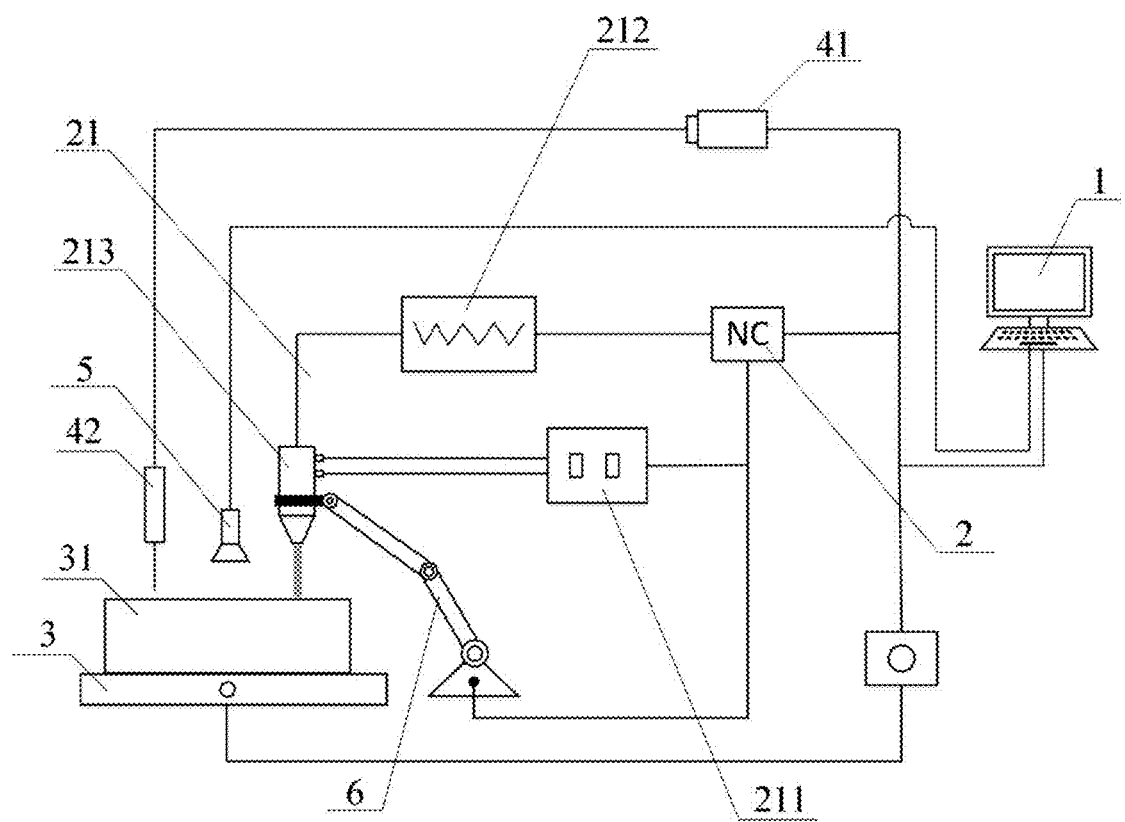
FIG. 1 is a schematic diagram of a device for implementing a method for rapidly forming a part using combination of arc deposition and laser shock forging.
Figure 2:
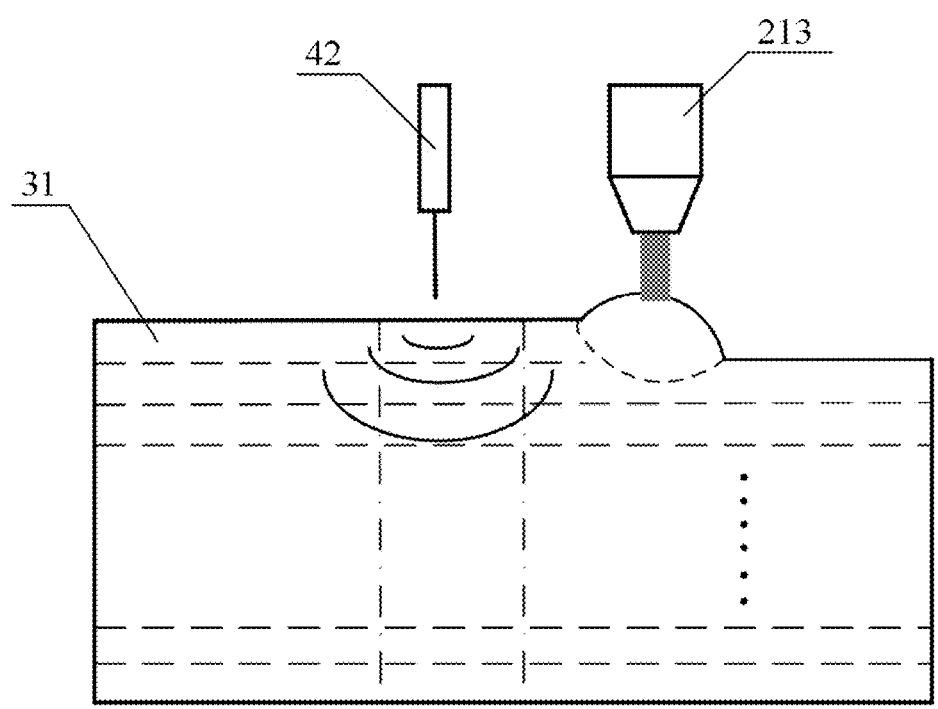
FIG. 2 is a schematic diagram showing a method for rapidly forming a part using combination of arc deposition and laser shock forging

According to FIGS. 1 and 2, the embodiment relates to a method for rapidly forming a part using combination of arc deposition and laser shock forging, including the following steps.

1) A 3D model of the part is drawn and imported into a simulation system of a computer 1. A preforming part model is divided into one or more simple forming units by the simulation system. A forming order of the forming units is determined. The forming units are laminated and sliced in a stack direction. The data is processed according to the laminated slices to generate a numerical control code for processing slices respectively. As shown in FIG. 1, the 3D model of the part is drawn by using the simulation software in the computer 1, or using other 3D drawing software (such as SolidWorks, UG, etc.) to draw the 3D model and imported into the simulation software. The preforming part model is divided into one or more simple forming units. The forming order of the forming units is determined. The forming units are laminated and sliced in the stack direction. The numerical control code is processed according to the laminated slices to generate a numerical control code for processing slices respectively.

2) The numerical code of each slice is sent from the computer 1 to a numerical control devices 2. An arc welding device 21 is controlled by the numerical device 2 to perform a melting deposition forming on a processing material layer by layer on a processing substrate of a motion platform 3 to form a melting deposition layer 31.

3) A movement of the motion platform 3 is controlled by the computer 1 to keep the fusion zone always in a horizontal state. At the same time, a pulse laser beam of a laser device is controlled by the computer 1 to perform synchronous shock forging on the arc deposition region at the plastic deformation temperature. During processing, a synchronous simulation processing is performed by the simulation system of the computer 1 while the melting deposition layer 31 is scanned in real time through a scanning imaging system 5. Data of temperature, thickness and morphology of the melting deposition layer 31 are transmitted to the computer 1. The imaging data and simulation data are comparatively analyzed. Then the working state of the arc welding gun and the laser device are adjusted and controlled by the computer according to a feedback.

The motion platform 3 has multi-degree-of-freedom, and the spatial movement of the multi-degree-of-freedom motion platform 3 is controlled by the computer 1. The spatial movement includes the spatial translation and rotation, which ensures the melting deposition layer 31 is in a horizontal state and prevents the fusant in the fused pool from shedding, flowing, collapsing, etc.

The computer 1 obtains the regional parameters of the melting deposition layer 31 in the forging temperature interval according to the obtained temperature, thickness and morphology data of the melting deposition layer 31, and controls the pulse laser to work. The output energy, pulse width, frequency are adjusted to adapt to different thickness and different area of the melting deposition layer 31. The laser shock forging is performed on the melting deposition layer 31 in the forging temperature interval to eliminate internal defects such as pores, cracks, and shrinkage porosity in the melting deposition layer 31 as well as the thermal stress and the residual stress. When the imaging data deviates from the simulated data, the computer 1 will adjust the parameters of the arc welding gun and the pulse laser. The adjusted parameters include arc welding voltage and current, welding speed and the feed quantity of material and gas as well as laser power, pulse width, forging frequency and spot shape and size. The arc welding parameters interact with the laser parameters to ensure that the working efficiency of the two is equivalent and the manufacturing quality of the parts is guaranteed.

Figure 3:
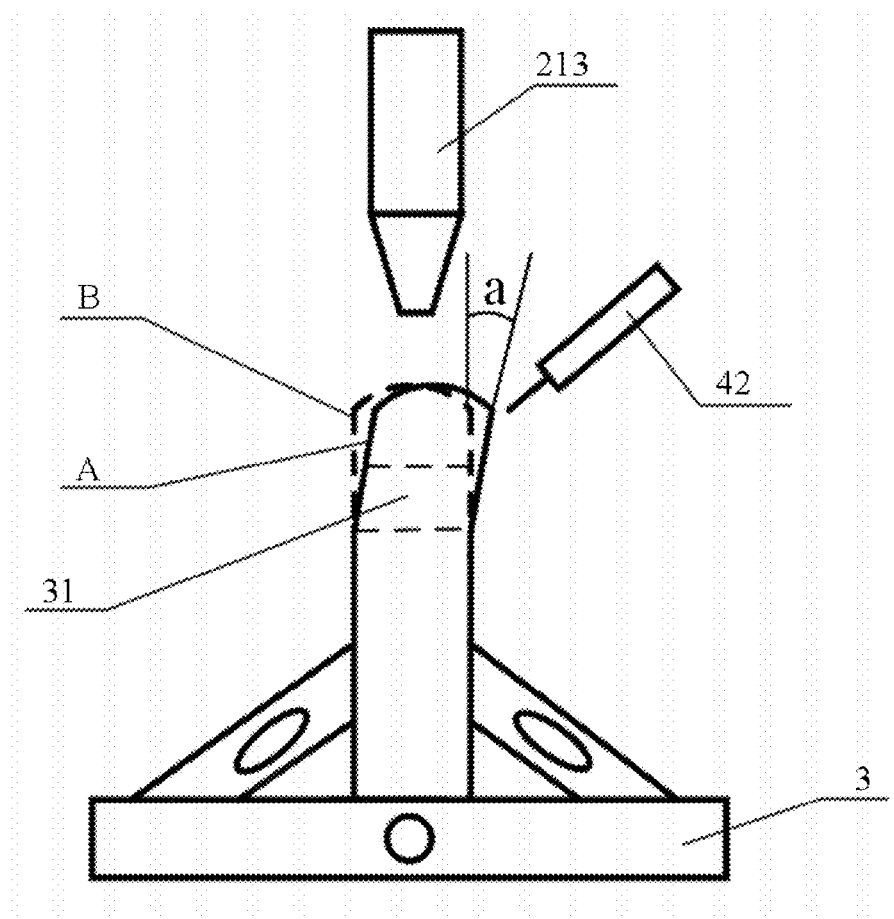
FIG. 3 is a schematic diagram showing a deformation zone of a melting deposition layer impact forged and corrected by of a oblique laser of a laser device of the present invention.

When the angle of the melting deposition layer 31 deviates, as shown in FIG. 3, a deviation angle a is generated between a imaging boundary A and a simulated boundary B. The computer 1 controls the laser beam of the pulse laser to shock forging the one or two sides of the melting deposition layer 31 at a certain oblique angle to precisely correct the shape of melting deposition layer 31, ensuring that internal defects such as pores, cracks, shrinkage porosity, and the like, and thermal stress and residual stress in the melting deposition layer 31 are eliminated. The forging temperature interval means that the depositing material has high plasticity and low deformation resistance in the temperature interval. Therefore, the forging temperature interval is different according to different materials and should be determined according to relevant data of the material.

Specifically, as shown in FIG. 1, step 3) comprises the following steps. The temperature of the arc deposition region is collected by the infrared thermal imaging system 5 and sent to the computer 1. When the temperature of the arc deposition region is cooled to the recrystallization temperature, the pulse laser of the laser device performs an shock forging on the melting deposition layer 31. When the temperature of the arc deposition region is too high/low, outputting a control signal to the arc welding device 21 by the computer 1 to reduce/improve the input power of the arc welding device 21 to form a closed loop control.

4) When the melting deposition layer 31 is formed by melting deposition and shock forging is completed, the arc welding device 21 and the laser device enter a starting station of the next layer of melting deposition layer 31 to perform the operation, and the cycle is continued until the entire part is formed by fusion.

In operation, the arc welding device 21 performs the arc deposition on the workbench to form a melting deposition layer 31, so that the temperature of the arc deposition region is within a plastic deformation temperature. The controller controls the laser device to perform synchronous shock forging on the melting deposition layer 31 of the arc deposition region, which not only ensures rapid forming of the parts, improves manufacturing efficiency, but also ensures the forming quality of the parts, and refines the grain of the melting deposition layer, eliminates internal defects such as pores of the melting deposition layer 31 as well as the thermal stress and the residual stress, thus effectively controls macroscopic deformation and cracking problems, and significantly improves internal quality and comprehensive mechanical properties of the part. Since the method controls the multi-degree-of-freedom space motion platform 3 by the computer 1, the problem of flowing, dripping and collapsing of the fused processing material is solved.

The arc welding device 21 is an argon or $CO_2$ arc welding gun.

The processing material is a weldable metal, an alloy material, a ceramic composite material, or a gradient changeable composite material.

The embodiment also provides an device for implementing the method mentioned above. As shown in FIG. 1, the device comprises a controller, the motion platform 3, the numerical control device 2, the arc welding device 21, the laser device, the scanning imaging system 5 and a mechanical arm 6. The controller is electrically connected to the numerical control device 2 and the laser device, and the numerical control device 2 is electrically connected to the arc welding device 21 and the mechanical arm 6. The arc welding device 21 containing the processing material is fixedly mounted on the mechanical arm 6. The arc welding device 21 is controlled by the numerical control device 2 through the mechanical arm 6 to perform a melting deposition forming of the fused processing material layer-by-layer on the motion platform 3. The beam of the laser device acts on the processing material on the motion platform 3, and the controller scans the processing material on the motion platform 3 by temperature, thickness and shape by the scanning imaging system 5.

In operation, the arc welding device 21 performs the arc deposition on the workbench to form the melting deposition layer 31, while the controller detects the temperature of the arc deposition region by the temperature sensor. A control signal is sent by the controller to control the output power of the arc welding device 21 so that the temperature of the arc deposition region is in the plastic deformation temperature interval. The laser device performs synchronous shock forging on the melting deposition layer 31 of arc deposition region under the control of the controller. During manufacturing, the metal grain is refined and structure is optimized, which prevents the occurring of the internal defects such as pores, incomplete fusion, and shrinkage porosity in the forming of metal parts by ordinary arc additive, and also improve the comprehensive mechanical properties of metal parts. As an arc deposition metal wire is formed into the melting deposition layer 31, the impact wave of the pulse laser device is precisely controlled to synchronously impact the melting deposition layer 31 at the plastic deformation temperature, achieving an efficient and high-quality "forging and constraining" forming in the same process.

The arc welding device 21 comprises a material and gas storage chamber 211, a power source 212, and an arc welding gun 213, and the controller is electrically connected to the arc welding gun 213 through the power source 212. The feeding inlet of the arc welding gun 213 is connected the outlet of the material and gas storage chamber 211, the outlet of the arc welding gun 213 is arranged above the motion platform 3, and the arc welding gun 213 is mounted on the mechanical arm. The power source 212 of the numerical control device 2 controls the arc welding gun 213 and at the same time controls the feed speed of the gas and the processing material of the stocker 211 which supplies the gas and the processing material to the arc welding gun 213, thus realizing the adjustment of the working state and the operating power of the arc welding gun 213.

The laser device comprises a laser generator 41 and an optical system 42. The beam emitted by the laser generator 41 acts on the processing material on the motion platform 3 through the optical system 42 electrically connected to the controller. The optical system 42 adjusts the direction of the beam generated by the laser generator 41 so that the beam can accurately act on the melting deposition layer 31 within the plastic deformation temperature interval, ensuring the effect of forging, and achieving the efficient and high-quality "forging and constraining" forming.

The scanning imaging system 5 is an infrared scanning imaging system. Of course, other systems that are capable of performing scan detection on the temperature, thickness and morphology data of the melting deposition layer 31 are also used in the present invention.

The controller is the computer 1. Of course, other computer 1 having electronic computing capabilities are also suitable for the present invention.

The above is only a preferred embodiment of the present invention, and the scope of the present invention is not limited thereto, thus equivalent changes made in the claims of the present invention are still within the scope of the present invention.

We claim:

1. A method for rapidly forming a part using combination of arc deposition and laser shock forging, comprising:
   1) importing a drawn 3D model of the part into a simulation system in a computer; dividing a preforming part model into one or more forming units by the simulation system and determining a forming order of the one or more forming units; laminating and slicing the one or more forming units in a stack direction to get laminated slices; processing data according to the laminated slices to generate a numerical control code for processing the laminated slices respectively;
   2) sending the numerical control code of each slice of the laminated slices from the computer to a numerical control device; controlling, by the numerical control device, an arc welding device to perform a melting deposition forming on a processing material layer by layer on a processing substrate of a motion platform to form a melting deposition layer;
   3) controlling, by the computer, a movement of the motion platform to keep a fusion zone always in a horizontal state, at the same time, a pulse laser beam of a laser device to perform a synchronous shock forging on an arc deposition region at a plastic deformation temperature; wherein during processing, a synchronous simulation processing is performed by the simulation system of the computer to get simulation data, while the melting deposition layer is scanned in real time through a scanning imaging system to get imaging data; and the imaging data of temperature, thickness and shape of the melting deposition layer are transmitted to the computer; the imaging data and the simulation data are comparatively analyzed, a working state of the arc welding device and the laser device are adjusted and controlled by the computer according to a feedback indicating a comparison between the imaging data and the simulation data;
   wherein the arc welding device and the laser device are adjusted and controlled by the computer by the following steps:
      collecting and transmitting data of the temperature of the arc deposition region by the scanning imaging system to the computer;
      performing the shock forging on the melting deposition layer by the pulse laser of the laser device when the temperature of the arc deposition region is cooled to a recrystallization temperature;
      when the temperature of the arc deposition region is too high/low, outputting a control signal to the arc welding device by the computer to adjust an input power of the arc welding device; and
      determining a pulse width of the pulse laser according to a thickness of the melting deposition layer, and determining a laser forging frequency and a spot value of the laser device according to a width of the melting deposition layer;
      controlling the laser device to perform the synchronous shock forging on the arc deposition region of the melting deposition layer within the plastic deformation temperature;
      collecting a laser data and adjusting the pulse width, forging frequency and spot value of the laser based on the laser data.

2. The method of claim 1, wherein the arc welding device is an argon or $CO_2$ welding gun.

3. The method of claim 1, wherein the processing material is a weldable metal, an alloy material, a ceramic composite material, or a gradient-variable composite material.

* * * * *